Aug. 14, 1956 F. B. QUINLAN 2,758,706
INSPECTION CONVEYING APPARATUS
Filed March 31, 1955 2 Sheets-Sheet 1

INVENTOR.
Frank B. Quinlan
BY
Roland A. Anderson
Attorney

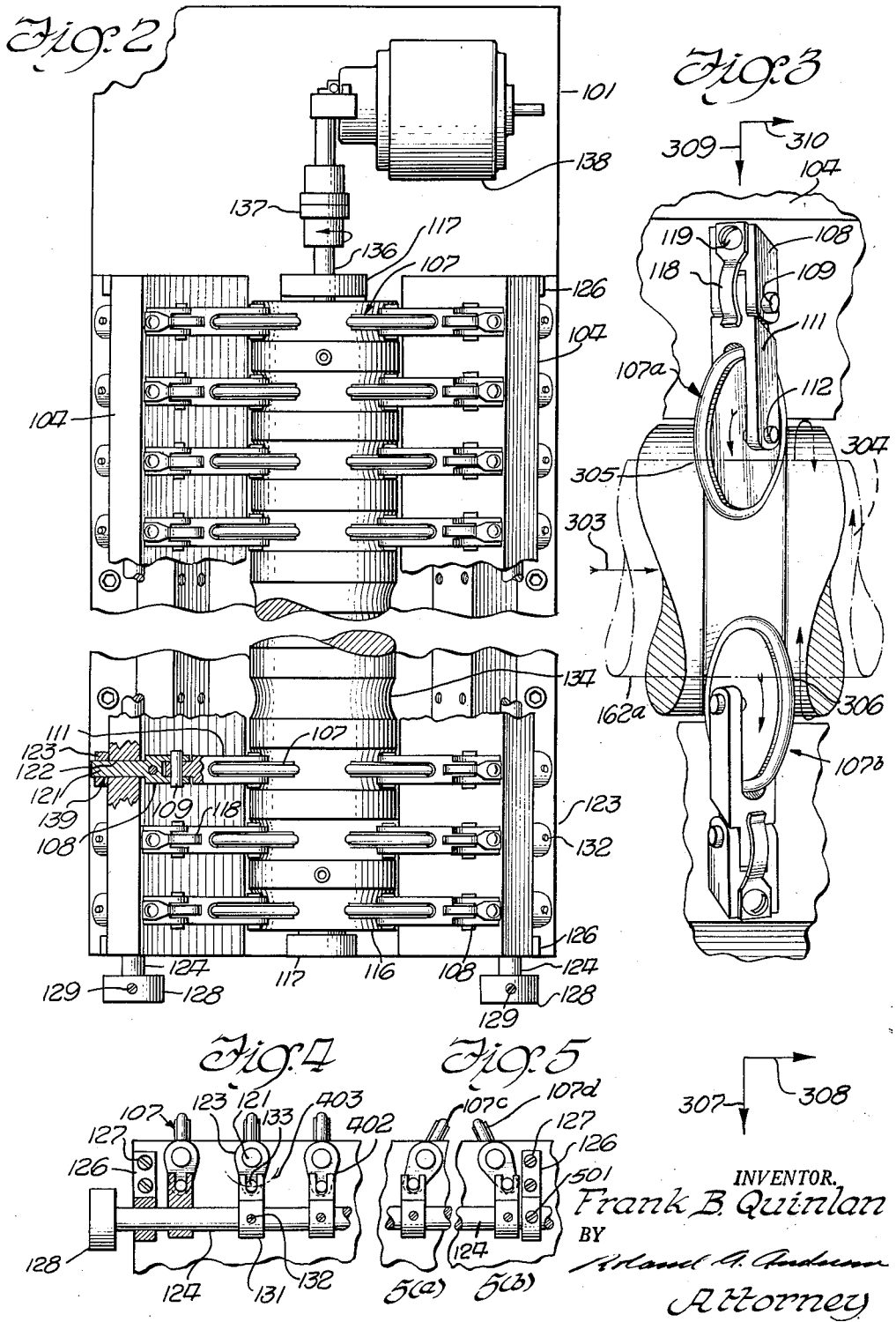

United States Patent Office
2,758,706
Patented Aug. 14, 1956

2,758,706

INSPECTION CONVEYING APPARATUS

Frank B. Quinlan, Richland, Wash., assignor to United States of America as represented by the United States Atomic Energy Commission Application March 31, 1955, Serial No. 498,456

6 Claims. (Cl. 203—75)

This invention relates generally to conveyor apparatus and more particularly to conveyor apparatus which are used on production line for the purpose of assisting in the inspection of finished products.

Conveyor mechanisms have been widely used for many years in many applications especially in the manufacturing fields. A wide variety of conveying applications in such fields as testing, spraying and labelling are well known. The function of such mechanisms is primarily to transport articles from one place to another for further processing of the articles during the various stages of manufacture. The conveyors are also used for moving newly manufactured articles past a station where inspection is performed on the articles by human or mechanical operators to maintain a minimum acceptable degree of quality. The usual type of a conveyor, which is used to aid in testing, possesses a movement primarily in one plane. If the manufactured article has to be inspected on all sides, a multitude of inspecting elements (assuming that this is a mechanized inspection) have to be dispersed radially in a plane transverse to the movement of the conveyor means so that multiple side inspections may be completed at one inspection station. Another method of inspection, which is used for inspecting an object on all sides, utilizes a multitude of inspecting elements which are dispersed along the path of travel of the conveyor means. When the object under inspection passes the first inspecting element, it is automatically turned over by suitable means to expose another surface which heretofore was not as yet inspected. This turning over is continued until the article has been totally inspected. The inspection methods used at the present time, as described hereinbefore, require the use of a large number of inspecting elements which are expensive and space consuming.

It is an object of the present invention to provide a conveyor means which possesses both translational and rotational movements.

Another object of the invention is to provide means for varying the ratio of speeds of the translational and rotational movements on the conveyor means.

A further object of the invention is to provide a simple and economical conveyor means which holds the transported object centered along the longitudinal line of travel.

Further objects and advantages of this invention will become apparent and will be understood by reference to the following description in conjunction with the accompanying drawings comprising several figures, wherein:

Figure 2 is a top view of the conveyor apparatus taken along the line 2—2 of Figure 1;

Figure 3 is an enlarged fragmentary top view taken along the same plane as Figure 2, showing the conveyor apparatus in a normal operating position;

Figure 4 is a fragmentary side view taken along the lines 4—4 of Figure 1;

Figure 5a is a fragmentary side view taken along the same plane as Figure 4 showing the conveyor apparatus in one of its extreme operating positions; and Figure 5b is a similar fragmentary side view showing the conveyor apparatus in the other extreme operating position.

Figure 1:
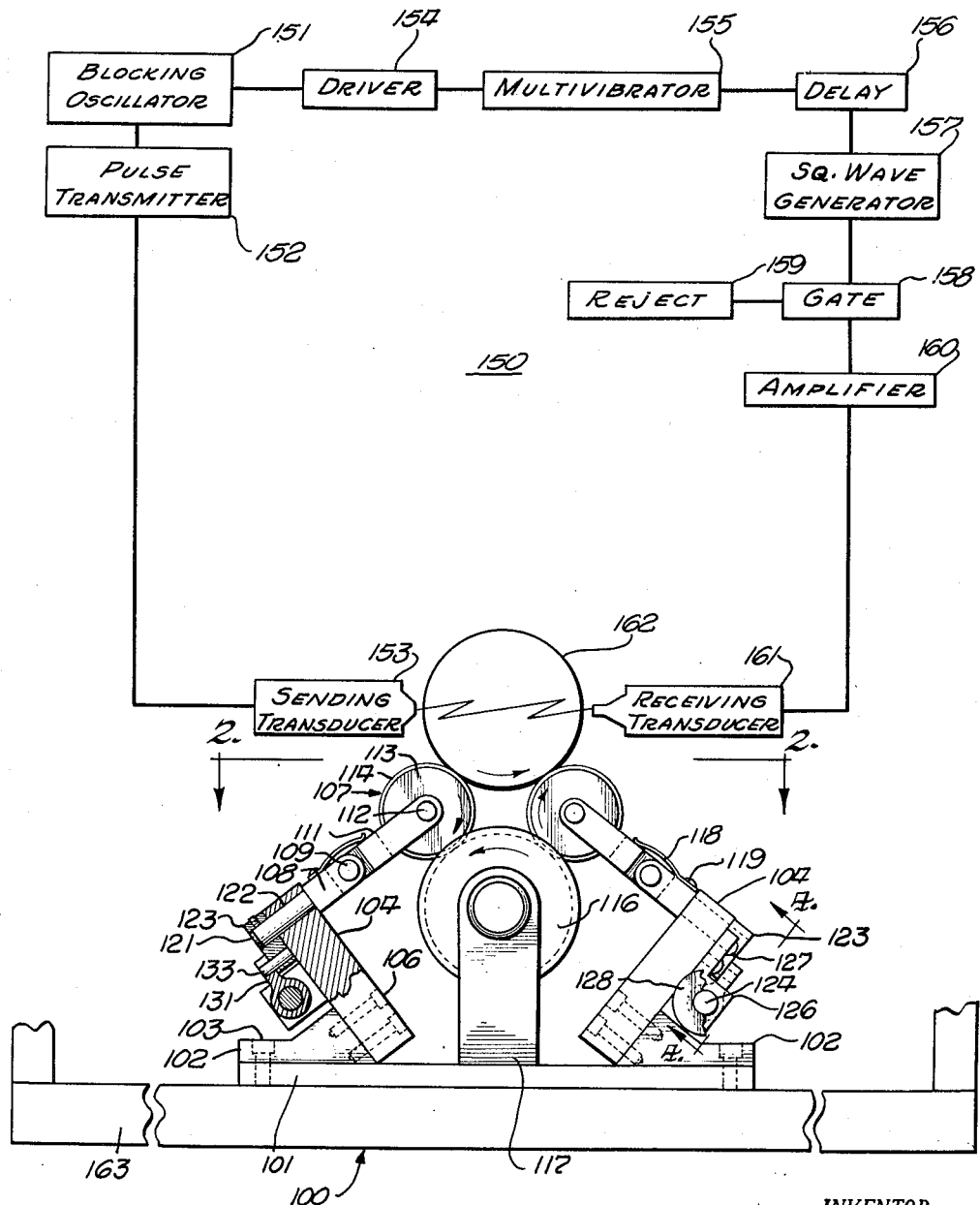
Figure 1 is a diagrammatical illustration of an ultrasonic testing system connected to a conveyor apparatus shown in an end view.

The attainment of the aforementioned objects is achieved by the presently described conveyor apparatus comprising an energized elongated roller centrally located between two rows of roller disks in contact with the roller and occupying tilted positions thereto. Each roller disk is operatively connected to a yoke control rod common to each row, which rod is used to adjust the amount of tilt of the row of disks with respect to the roller. The rotation of the roller imparts rotative motion to the disks which in turn transmit rotational as well as translational motions to any cylindrical object placed upon the two rows of disks and supported thereby. The conveyor apparatus is used in conjunction with an inspection circuit to inspect cylindrical fabricated objects for uniformity in crystal structure.

The conveyor apparatus, to be described hereinafter, forms a part of an ultrasonic inspecting system which is used for testing the grain structure of fabricated cylindrical objects which have undergone a heat treatment. A fabricated object or slug that has been properly heat treated, possesses a particular grain structure wherein the grains have a certain magnitude. The difference in size of the grains of a properly and improperly heat treated slug is the basis for the ultrasonic inspection system developed for inspecting the quality of the slugs.

The slug conveyor is primarily designed to transport slugs through a series of nondestructive tests. The nature of these tests is such that they require a rotational as well as a translational motion past each test station; however, the ratio of rotational to translational motion may vary from test to test. The slug conveyor, as illustrated in the accompanying figures, shows only one portion of an inspection conveyor line at which a particular test is performed.

Referring to all of the figures, and in particular to Figures 1 and 2, a roll conveyor 100 comprises a base plate 101 which serves as a means of support for the remaining components of the conveyor. A pair of angle plates 102 is mounted by bolts 103 to the base plate 101 along each of its longitudinal sides. A disk support member 104 is mounted on each angle plate 102 by means of bolts 106. Each of the disk support members 104 serves as a means for supporting a plurality of roller disks 107 through the intermediary of a pivoting fork 108 and a pin 109 pivotably connecting said pivoting fork 108 to a fork 111 which is used to support the roller disk 107 by means of a pin 112. The roller disk 107 comprises a wheel 113 having a groove in its periphery (not shown) for mounting a rubber tire 114. A roller 116 is positioned centrally along the longitudinal axis of the base plate 101 and rotatively supported in that position at either end by means of supports 117 which are attached by suitable means to the base plate 101. As seen in the Figure 1, the roller disks 107 normally rest on the surface of the roller 116, the roller disks 107 being forced against the surface of the roller 116 by means of springs 118 which are attached by screws 119 to the pivoting forks 108. The pivoting fork 108 has a pivot shaft 121 (shown in the broken section) which extends through a bore 122 in the body of the disk support member 104 thereby allowing the pivoting fork 108 to be rotated within certain limits to effect angular positions (Fig. 3) of the roller disks 107 with respect to the surface of the roller 116. The pivot shaft 121 of the pivoting fork 108 extends through the disk support member 104 and terminates within a pivot control member 123.

A top view of the roll conveyor 100 is shown in Figure 2. A pair of yoke control rods 124 extend along the length of the roll conveyor 100 and are mounted by means of rod supports 126 which are secured at each end of the disk support members 104 by screws 127. One end of each of the rods 124 extends beyond the rod support 126 and terminates in a control knob 128 which is secured thereto by means of a set screw 129. One of the control knobs 128 has been removed to expose the details of the pivot arrangement shown in the fragmentary view (Fig. 1). There is distributed along the entire length of each rod 124, a plurality of yokes 131 which are secured to the rod 124 by set screws 132. Each of the yokes 131 is associated with a roller disk 107. Each of the yokes 131 engages a tilt pin 133 mounted on the pivot control member 123 which engages the shaft 121 of the pivoting fork 108. The control knobs 128 enable an operator to move slidably the rods 124 through the rod supports 126 to any desired position, and thereafter the rods may be locked in that position by set screws 501 (Fig. 5). The initial movement of the rod 124 will cause the yokes 131 to transmit a tangential force to the pivot control members 123 which in turn will transmit a pivoting force through the intermediary linkage to tilt the roller disks 107. Figure 5a shows the tilted position of the roller disk 107 when the rod 124 is pulled to the extreme of one position and Figure 5b shows the tilted position of the roller disk 107 when the rod 124 is pulled to the extreme of the other position. Along the entire length of the roller 116, there is located a series of concave indentations or grooves 134, each of said indentations being associated with a pair of oppositely mounted roller disks 107. The function of the concave indentations 134 is to provide a good support for the roller disks 107 to minimize the amount of drop of an inspected object 162, resting on the roller disks 107, whenever the roller disks 107 are tilted additionally with respect to the roller 116. One end of the roller 116 terminates in a shaft 136 which is connected by means of a coupling 137 to a constant speed motor 138. The motor 138 is mounted by suitable means to the base plate 101.

As is evident in Figure 2, the roller disks 107 have a vertical movement with respect to the base plate 101 because of the pivot at the pin 109 enabling the roller disks to adjust themselves to the contours of the indentations 134 in the roller 116. The roller disks 107 have a tilt movement at the pivot points 139 so that either face of the roller disks 107 may be inclined to the surface of the roller 116 (Fig. 3). The spring 118 is not shown in this fragmentary view of Figure 2 in order to expose the pivot connection of the fork 111 with the pivoting fork 108 through the medium of the pin 109.

Figure 3 shows an enlarged view of a pair of opposing roller disks 107a and 107b supporting a slug 162a shown in phantom view. The details of construction of the various members supporting the disks 107a and 107b are readily apparent.

If reference be had to Figure 4, the pivot control member 123 has a tilt pin 133 engaging a bifurcated member 402 of the yoke 131. The yoke control rod 124 serves as a means of supoprt for the yokes 131. An application of force along the axis of the rod 124 through the control knob 128 will move the yokes 131 mounted on the rod 124 to thereby impart movements to the tilt pins 133 so that they move along arcuate-paths 403. This motion is eventually transmitted to the roller disks 107 to effect a tilt thereof with respect to the surface of the roller 116.

Figure 5a shows the extreme tilt position of a roller disk 107c for moving a slug in one direction, and the Figure 5b shows the extreme tilt position of the roller disk 107d for moving a slug in the opposite direction. A set screw 501 allows the yoke control rod 124 to be locked after a desired tilt position of the roller disks has been reached.

As was mentioned before, the ultrasonic inspection system, as indicated diagrammatically in Figure 1, has been developed to inspect slugs which have undergone heat treatment. The test is based on the fact that the absorption of ultrasonic waves in the material comprising the slugs is dependent, to a large extent, on average grain size of the material. This effect is particularly pronounced if the wave length of the vibration transmitted through the slug is not large in relation to the average grain diameter. For example, if the average grain size of a certain normal production material is about .03 millimeters, and the grain growth associated with a particular heat treating process increases this to about .10 millimeters at the transformation, it is evident that the magnitude of the ultrasonic beam through the slug will be affected by the crystal structure. At the chosen operating frequency of 5 mega-cycles, the relation $$\frac{\lambda \text{ (ultrasonic wave length)}}{G \text{ (average grain diameter)}}$$

is roughly 18 before transformation and 5 after transformation. It follows that ultrasonic pulses are propagated through an untransformed or partially transformed slugs with larger amplitude than through a transformed one. The undesirable slugs can, therefore, be segregated by rejecting those which permit the received pulses to exceed a preset limit.

The basic operation of this type of ultrasonic instruments, consists of generating high frequency ultrasonic pulses of very short time duration, transmitting them through the article under investigation, amplifying the pulses that have passed through the article, and interpreting electronically the received data to either keep or reject the inspected article. An ultrasonic inspection circuit 150 comprises the following interconnected stages: A blocking oscillator 151, a pulse transmitter 152, a sending transducer 153, a driver 154, a multivibrator 155, a delay circuit 156, a square wave generator 157, a gate circuit 158, a reject circuit 159 for rejecting improperly heat treated slugs, an amplifier 160, and a receiving transducer 161. The individual circuits comprising the inspection circuit 150 are conventional and will not be described in detail.

The multivibrator 155 constitutes a timing center of the inspection circuit and is of conventional design. The output of this circuit determines the pulse repetition rate. The pulses originating in the multivibrator 155 are amplified in the driver stage 154 and transmitted to the blocking oscillator circuit 151. The blocking oscillator 151 generates positive pulses of very short time duration which are applied to the pulse transmitter 152. The transmitter 152 is normally biased to cutoff and the application of the positive pulses from the blocking oscillator 151 to the transmitter 152 will cause it to conduct heavily for very short time durations. The output of the pulse transmitter 152 is transmitted to the sending transducer 153 which converts the output to an ultrasonic beam and directs it against an inspected slug 162.

Simultaneously with the pulsing of the transmitter 152, a pulse is also transmitted from the multivibrator 155 to the delay circuit 156. The pulse from the timing multivibrator 155 triggers the delay circuit 156 into a quasi-stable state for an adjustable period of time after which it returns to its stable state to remain there until the arrival of the next trigger pulse. The time period during which the delay circuit 156 remains in quasi-stable state is adjusted to end just before the arrival of an ultrasonic pulse, said pulse having passed through the slug 162 into the receiving transducer 161 which reconverts the received vibrations into received electrical pulses. At this instant, the output from the delay circuit 156 triggers a square wave generator 157. A positive square wave signal generated by the square wave generator 157, which is adjustable to certain time durations, is fed to the next stage, the gate circuit 158. This square wave signal opens the gate circuit to pass the received pulses amplified by the amplifier 160, said received pulses arriving simultaneously with the square wave signal. The square wave generator 157 is normally adjusted to open the gate circuit 158 for a period slightly longer than the time length of the received pulses fed from the amplifier 160. This insures the passage of the proper pulses and the exclusion of all others. The received pulses from the amplifier 160, if they are of sufficient amplitude to pass through the gate circuit 158, are transmitted to the reject circuit 159 which initiates a reject mechanism (not shown) to eject the examined faulty slug.

*Method of operation*

The roll conveyor 100 is operated while submerged in a fluid, such as water. As shown in Figure 1, the roll conveyor 100 is contained in a tank 163 which may be filled with water to a sufficient depth to submerge the conveyor as well as the specimen undergoing inspection. Assuming for the moment that the motor 138, which is coupled to the roller 116, is running in a particular direction so that the rotational force imparted to the roller 116 is in the direction (counterclockwise in Fig. 1) indicated by the arrow on said roller, the roller disks 107 will be rotated in the direction indicated by the respective arrows imparting thereby a counterclockwise rotation to the slug 162. Assuming also for the moment, that the yoke control rods 124 were set so that the roller disks 107 have a tilted position, for example, as shown for the pair of opposing roller disks 107a and 107b, a rotational as well as translational force will be imparted to the slug 162a (shown in phantom view in Figure 3) causing it to move in the direction indicated by an arrow 303, and to rotate in the direction indicated by an arrow 304 on the slug 162a. In the phantom view, the slug 162a is to be considered as resting atop the roller disks 107a and 107b coming in contact therewith at contact points 305 and 306, respectively. The force which is imparted to the slug 162a at the points 305 and 306 by the roller disks 107a and 107b, respectively, can be separated into components as shown by vectors 309 and 310, 307 and 308, respectively. The vectors 307 and 309 represent the forces responsible for the rotational movement of the slug 162a and the vectors 308 and 310 represent the forces which cause a translational movement of the slug 162a in the direction indicated by the arrow 303. Reference to the components of the forces applied by the respective disks 107a and 107b to the slug 162a at the points 305 and 306, respectively, will indicate that the vector 310 adds to the vector 308, and vector 309 adds to the vector 307 to simultaneously rotate and translate the slug 162a in the directions indicated by the arrows 304 and 303, respectively.

Whenever a slug 162 is to be tested, it is placed at the free end of the roll type conveyor 100. The rotation of the roller 116 will impart rotational force to the roller disks, shown as 107a and 107b, to propel the slug 162 along the conveyor as well as to impart rotational movement thereto. The passage of the slug 162 past the sending transducer 153 will intercept the ultrasonic beam transmitted by said transducer 153. The beam passes through the slug 162 and is received by the receiving transducer 161. During its translational movement along the conveyor 100, the slug 162, as a result of its rotation, will expose the entire surface along its periphery to the beam transmitted by the sending transducer 153 so that the inspection beam is transmitted through the girth of the entire length of the slug 162. The rotational movement of the slug 162 is coordinated with the translational movement thereof so that the inspection beam transmitted by the sending transducer 153 will inspect the whole structure of the slug 162. If the slug 162 has been properly heat treated, the grain size will be large and will attenuate sufficiently the signal transmitted by the sending transducer 153 so that only a weak signal is picked up by the receiving transducer 161. This signal is amplified to a certain degree by the amplifier 160 but since the signal has been attenuated in passing through the body of a properly heat treated slug 162, it is insufficient to operate the reject stage 159 and therefore the slug will be accepted. If the slug 162 had not been subjected to a proper heat treatment, the grain size will be small, as described hereinbefore, and will permit a strong signal to pass therethrough and be received by the receiving transducer 161. This strong signal is additionally amplified by the amplifier 160 and then passes through the gate stage 158 to operate the reject stage 159. The reject stage 159 may be arranged with other means, such as a relay, so that in case a faulty slug is examined in the ultrasonic test circuit 150, the reject relay will be energized to actuate a signal to stop the conveyor drive until the faulty slug is manually removed and the ultrasonic test circuit is reset again for the testing of another slug.

While specific arrangements and embodiments have been disclosed in the drawings, it will be understood that the invention is not limited thereto, and that various changes and modifications may be made without departing from the spirit and scope of the invention.

What is claimed is:

1. A conveying apparatus for transporting objects past an inspecting station, said apparatus comprising an elongated member, a plurality of elements in driving contact with the member and adapted to support and move an object placed upon said elements, means for adjusting the position of the elements with respect to the member to vary the movement of the object, and means for actuating the member to transfer motion to the elements to thereby move the object placed thereupon.

2. The apparatus as claimed in claim 1, in which the elements comprise roller disks angularly mounted with respect to the longitudinal axis of the member whereby any object placed upon said roller disks is simultaneously rotated and translated thereover.

3. The apparatus as described in claim 1, in which the adjusting means comprise pivot means associated with each element, and a longitudinal member interconnecting in tandem one-half of said pivot means to control the angular position of said elements with respect to the longitudinal axis of the member whereby the ratio of speed between the rotational and translational movements may be varied.

4. An apparatus for simultaneously rotating a cylindrical object and conveying it axially, said apparatus comprising a driving roller having a considerable axial length, a first set of roller disks distributed along one side of the roller and engaging the same to be rotated thereby, a second set of roller disks distributed along the other side of the roller and engaging the same to be rotated thereby, the first set of disks being oppositely spaced from the second set in a direction around the driving roller, the two sets of disks adapted to receive any cylindrical object placed thereon and impart rotational movement thereto, and means for tilting the disks with respect to the longitudinal axis of the roller whereby the cylindrical object is moved axially along the roller between the two sets of the roller disks.

5. The apparatus as claimed in claim 4, in which the driving roller has circumferential grooves spaced along the length thereof and in working contact with the disks, and said tilting means adapted to vary the angle of contact of the disks with the grooves whereby the speed at which the cylindrical object may be moved along the roller may be varied.

6. An apparatus for conveying objects past an inspection station, said apparatus comprising a long roller having a plurality of circumferential indentations, two sets of roller disks, means for mounting the sets of disks in apposition to each other and in distribution along the roller and in a driving relationship with said roller, pivot means supporting each of said disks; two sets of roller disks appositely mounted to form a trough to support an object therebetween, each pair of appositely mounted disks engaging the same indentation in the roller, and a bar connecting in tandem the pivot means of each set of roller disks to vary the angle of the disks with respect to the longitudinal axis of the roller; whereby a portion of the rotational force transmitted by the roller to the disks is converted to a translational component depending on the angle of the disks with respect to the roller axis.

References Cited in the file of this patent
UNITED STATES PATENTS

| 2,525,305 | Lombard | Oct. 10, 1950 |

FOREIGN PATENTS

| 557,882 | Germany | Aug. 29, 1932 |
| 1,052,605 | France | Sept. 23, 1953 |